United States Patent [19]
McConnell

[11] Patent Number: 5,436,957
[45] Date of Patent: Jul. 25, 1995

[54] SUBSCRIBER CONTROL OF ACCESS RESTRICTIONS ON A PLURALITY OF THE SUBSCRIBER'S TELEPHONE LINES

[75] Inventor: Von K. McConnell, Springfield, Va.

[73] Assignee: Bell Atlantic Network Services, Inc., Arlington, Va.

[21] Appl. No.: 336,700

[22] Filed: Nov. 7, 1994

Related U.S. Application Data

[63] Continuation of Ser. No. 996,538, Dec. 24, 1992, abandoned.

[51] Int. Cl.$^6$ ............................................. H04M 3/42
[52] U.S. Cl. ...................... 379/88; 379/196; 379/197; 379/201; 379/207; 379/230; 379/95
[58] Field of Search ............... 379/188, 189, 196, 197, 379/198, 199, 200, 201, 207, 95, 67, 88, 89, 230

[56] References Cited

U.S. PATENT DOCUMENTS

| | | | |
|---|---|---|---|
| 4,313,035 | 1/1982 | Jordan et al. | 379/211 |
| 4,332,982 | 6/1982 | Thomas | 379/200 |
| 4,596,900 | 6/1986 | Jackson | 379/77 X |
| 4,756,020 | 7/1988 | Fodale | 379/112 |
| 4,796,293 | 1/1989 | Blinken et al. | 379/202 |
| 4,833,707 | 5/1989 | Serret, Jr. | 379/200 |
| 4,896,346 | 1/1990 | Belfield et al. | 379/196 |
| 4,937,854 | 6/1990 | Sarakas | 379/199 |
| 4,939,773 | 7/1990 | Katz | 379/204 |
| 4,987,590 | 1/1991 | Katz | 379/204 |
| 4,993,062 | 2/1991 | Dula et al. | 379/88 |
| 5,091,933 | 2/1992 | Katz | 379/204 |
| 5,109,408 | 4/1992 | Greenspan et al. | 379/197 |
| 5,200,995 | 4/1993 | Gaukel et al. | 379/200 |
| 5,222,125 | 6/1993 | Creswell et al. | 379/201 |
| 5,241,580 | 8/1993 | Babson et al. | 379/201 |
| 5,241,588 | 8/1993 | Babson et al. | 379/201 |
| 5,247,571 | 9/1993 | Kay et al. | 379/207 |
| 5,345,380 | 9/1994 | Babson et al. | 379/201 |

FOREIGN PATENT DOCUMENTS 60-177764  9/1985  Japan .................. 379/196

OTHER PUBLICATIONS

Pierce et al, "Meeting Private Needs with the Public Network", BellCore Exchange. Jan./Feb. 1988 pp. 8–13.

Pasternak et al. "Taking the Pain out of change", BellCore exchange May/Jun. 1986 pp. 28–33.

Brosemer et al. "Virtual Networks: Past, Present and Future", IEEE Communications Magazine Mar. 1992 pp. 80–85.

Perdue et al. "Conversant 1 Voice System: Architecture and Applications," AT&T Technical Journal, Sep./Oct. 1986 pp. 34–47.

"Call Control," Hello Direct Catalog, Winter 1991 pp. 38–39.

*Primary Examiner*—James L. Dwyer
*Assistant Examiner*—Daniel S. Hunter
*Attorney, Agent, or Firm*—Lowe, Price, LeBlanc & Becker

[57] ABSTRACT

A subscriber inputs data into a centralized database of the public switched telephone network to control communication services which the network provides via a number of telephone lines assigned to the subscriber. The subscriber offers the communication service over the lines to selected ones of the subscriber's own customers. The input data may relate to a variety of different parameters for use in controlling the service. For example, the data may identify specific lines, define periods of time when service should be available, define authorization codes, establish restriction on what types of calls can be made or specify parameters for controlling the routing of the calls over specific trunks groups, or the like. The subscriber can thereby limit the time service is available, can control which customers can use the communication service, can restrict what types of calls the customers can make or can control the telephone network to route calls over the subscriber's private facilities.

28 Claims, 7 Drawing Sheets

SUBSCRIBER CONTROL OF ACCESS RESTRICTIONS ON A PLURALITY OF THE SUBSCRIBER'S TELEPHONE LINES

This application is a continuation of application Ser. No. 07/996,538 filed Dec. 24, 1992, now abandoned.

TECHNICAL FIELD

The present invention relates to methods and system structures which will permit a commercial telephone subscriber to offer its customer's access to telephone services over a group of the subscriber's lines on a basis controlled by the subscriber. More specifically, the present invention permits the subscriber to turn on and off telephone service on the group of lines and to establish access authorization codes which the subscriber can give to its customer's to control their use of the group of lines, to restrictions on the types of calls the customers can make, and/or control how the calls will be routed.

ACRONYMS

The written description uses a large number of acronyms to refer to various services and system components. Although known, use of several of these acronyms is not strictly standardized in the art. For purposes of this discussion, acronyms therefore will be defined as follows:

Advanced Intelligent Network (AIN)
Automatic Number Identification (ANI)
Common Channel Inter-office Signalling (CCIS)
Data and Reporting System (D&RS)
Dual Tone Multi-Frequency (DTMF)
Integrated Service Control Point (ISCP)
Interactive Voice Response (IVR) unit
Local Access and Transport Area (LATA)
Service Circuit Node (SCN)
Service Control Point (SCP)
Service Management System (SMS)
Service Switching Point (SSP)
Signaling System Seven (SS#7)
Signaling Transfer Point (STP)
Station Message Detail Recording (SMDR)
Service Creation Environment (SCE)
Transaction Capabilities Applications Protocol (TCAP)

BACKGROUND ART

In recent years a number of Intelligent Network type telephone system architectures have been developed to provide and control a variety of communication services from a centralized database within the telephone network. In such a system, the central database controls switching operations through multiple end offices. Local and/or toll offices of the public telephone network detect a call processing event identified as an AIN "trigger". For ordinary telephone service calls, there would be no event to trigger AIN processing; and the local and toll office switches would function normally and process such calls without referring to the database for instructions. An office which detects a trigger, however, will suspend call processing, compile a call data message and forward that message via a common channel interoffice signalling (CCIS) link to a Service Control Point (SCP) which includes the database. If needed, the SCP can instruct the central office to obtain and forward additional information. Once sufficient information about the call has reached the SCP, the SCP accesses its stored data tables to translate the received message data into a call control message and returns the call control message to the office of the network via CCIS link. The network offices then use the call control message to complete the particular call.

Pierce et al., "Meeting Private Needs with the Public Network", BELLCORE EXCHANGE, January/February 1988, pp. 8–13, is one example of a disclosure of an intelligent network architecture which includes a description of the variety of communication services which such a network can offer. As disclosed therein, the network identifies a number of lines for a commercial subscriber as members of a closed group, referred to as a private virtual network, even though those lines connect to a number of different local switching offices. The system then uses subscriber data stored in the SCP to control the end offices to offer services such as routing control, class of service restriction and corresponding access authorization to override the restriction, and a telecommuting service whereby services available on a subscriber business line may also be available on the subscriber's home line. The customer can also change the programming in the SCP so that when an employee moves, the network number used to reach that person stays the same even though that person is assigned a new public-network directory number. Pierce et al. further suggest that the intelligent network can provide a closely related "Area Wide Centrex" service offering additional features, such as call transfer, to a closed user group.

Although such intelligent network systems offer commercial subscribers considerable flexibility in customizing their telephone services, they have not as yet offered such subscriber's as much control over availability of services and/or access restrictions for such services. In one example, an airline operating a courtesy lounge might want to activate phone service via telephones in the lounge and offer that service to passengers on a delayed flight. It would be desireable, however, to control the service carefully to avoid abuse. Some access control has been provided by the telephone network, including the systems using intelligent network architectures, however, they do not offer the subscriber sufficient direct access to the data in the SCP or the flexibility to control authorization codes, to efficiently provide the control necessary for the airline courtesy lounge example.

For example, U.S. Pat. No. 4,756,020 to Fodale suggests access authorization control in an AIN type multiple office environment. The Fodale system however, restricts access to a long distance telephone network based on the status of the billing number associated with the call, i.e. delinquent. In the Fodale network, the information in the database can not be modified by the customer and does not activate or deactivate service to one subscriber's identified group of lines. Also, Fodale does not suggest storing any authorization code or password data in the database.

U.S. Pat. No. 4,313,035 to Jordan et al. patent discloses a method of providing a person locator service through multiple exchanges of the switched telephone network using an intelligent network type of telephone system architecture. Jordan et al. teach offering the subscriber access to the subscriber's data in the central database, to input data for controlling the person locator service. The Jordan et al. system, however, does not activate service provided via a group of the subscriber's telephone lines and does not allow the subscriber to establish codes or passwords to control access to the activated service.

U.S. Pat. No. 5,109,408 to Greenspan et al. discloses a telephone communication system for blocking calls to certain types of telephone numbers, typically 900 or 976 numbers. In response to such a call, the local switching office launches a query to the database, and the database returns a response message instructing the switch as to how to process the call. The response can instruct the switch to play an announcement and collect digits, terminate the call, connect the call to a translated destination number or connect the call to a dialed destination number. In one example given, the switch is configured to block all 976 calls, but the switch will query the database regarding override under certain circumstances. To override a call block, the subscriber goes off-hook, dials an access code and a 976 directory number. In response, the switch launches the query to the database. The database checks the customer's data file. If the customer has requested completion under such circumstances, the database sends back an instruction to the switch to complete the call to the dialed 976 directory number. If the subscriber's data indicates that the subscriber has requested a screening procedure, the database would send back an instruction to play an announcement and collect additional digits, e.g. corresponding to the subscriber's personal identification number. In this second case, the database sends the call completion instruction only after the caller has passed the screening procedure specified by the subscriber. Greenspan et al. however, do not allow one subscriber to control outdialing services on a plurality of the subscribers lines and do not allow the subscriber to change the subscriber's data during an interactive call-in procedure.

U.S. Pat. No. 4,896,346 to Belfield et al. discloses an automated telephone switching system which provides restricted access to a subscriber's trunk facilities using an authorization code and a spoken password to identify persons permitted access. Also, the subscriber can enter the password in the database within the telephone network using an interactive procedure. Belfield et al., however, do not allow the subscriber to establish different authorization codes, particularly codes which relate to the subscriber's products or services.

From the above discussion it becomes clear that a need still exists to offer subscriber's greater control over activation of services and related restrictions to services, so that subscribers can in turn offer those services to their own customer's on a carefully restricted basis. The subscriber should be able to turn on the service for a group of the subscriber's lines at will, without intervention by telephone company personnel. The subscriber should also have the ability to easily establish authorization codes for use in accessing such services, so that the subscriber can give the codes only to those customer's to whom it wishes to offer access to the communications services. The subscriber should also be able to control routing of calls through the network to minimize costs and/or optimize use of the subscriber's own private facilities.

DISCLOSURE OF THE INVENTION

The present invention meets the above discussed needs by using an Advanced Intelligent Network (AIN) type communication system architecture. A central database in an Integrated Service Control Point (ISCP) controls the switching operations through multiple end offices of the network. The present invention allows a, commercial subscriber to interact with a database maintained in the ISCP, to establish and modify various criteria to activate and/or restrict communication services provided on a group of the subscriber's telephone lines.

As used throughout the description of the present invention, the term "subscriber" refers to an entity which purchases communication services from a Telephone Company or other common communication carrier. A commercial subscriber will typically offer for sale one or more products or services, which may not relate to communications. The term "customer" refers to a person who normally buys products or services from such a commercial subscriber.

Accordingly, the present invention relates to methods and systems for controlling the provision of communication services over an identified group of communication lines assigned to one subscriber. The lines connect to a switched communication network having a plurality of switching offices. The subscriber inputs information defining criteria under which the subscriber wishes to offer communication services over the group of lines to one or more of the subscriber's customers. The input information is stored in a centralized database in the switched communication network separate from the plurality of switching offices. The system will detect when a person, e.g. one of the subscriber's customers, wants to use one of the subscriber's lines. For example, the connected switching office will recognize an attempt to seize the one line. The connected switching office will transmit information characterizing the attempt to obtain a communication service to the centralized database. The subscriber's information stored in the database is accessed, and the system provides switched communication service on the one communication line of the subscriber's group if the information characterizing the attempt to obtain a communication service meets the stored criteria.

The criteria set by the subscriber can relate to a wide variety of different factors. For example, the subscriber can activate the service for a set period by inputting on-time and off-time data. A subscriber can also define authorization code criteria, and the party using the line must then input a valid code before the system would provide the actual communication service. The information stored in the centralized database can limit the types of calls which the subscriber's customers can make over the line and can control routing of calls through the communication network.

In one mode of operation, the subscriber would input an authorization code including a product code identifying a product or service for which the identified lines of the subscriber's group are to be activated, and a password to be used with the particular product code. The subscriber would also input an on-time and an off-time defining an interval during which the service should be active. The product code corresponds to some information identifying a particular product or service offered by the subscriber, such as a model number for a particular item sold by the subscriber, a late airline flight, etc. The password is an arbitrary code which the subscriber will then give only to persons the subscriber wishes to have access to the communication service.

In a preferred embodiment, an off-hook at one of the subscriber's identified lines triggers AIN processing. At this point, the local office sends a query to the ISCP which sends back an instruction for the local office to play a dial tone. Although provided as an announcement from a separate announcement trunk or platform, to the subscriber the dial tone sounds like normal central office dial tone. The caller then dials a destination number in the normal manner. Alternatively, the AIN processing could be triggered in response to other events, for example after normal central office dial tone and collection of destination digits dialed in via one of the lines of the subscriber's group.

In the mode of operation using an authorization code, the central office provides an announcement to the caller in the form of a subsequent dial tone or synthesized speech message requesting entry of the authorization code. The local office then receives and forwards to the ISCP dialed digits corresponding to an authorization code. The ISCP checks the product code and the password from the dialed input for validity. More specifically, the central office sends the authorization code as a single string of digits containing both the product code and the password. When the ISCP validates a received product code and password, it actually breaks the received digits down into two pieces and processes the product code and password separately.

If both the product code and password are valid, the ISCP checks the time of the present call against data stored in the subscriber's data table indicating the on and off times for activating the communication service related to the particular product. If the call occurs during the on time interval, the ISCP sends a return result message instructing the central office to resume call processing and route the call to the dialed destination. The return message from the ISCP may include instructions to route the call over private trunk facilities owned or leased by the commercial subscriber, particularly where the ISCP determines that the desired call is an inter-LATA call. The network executes normal call processing routines for servicing the call using the information received from the ISCP.

As part of the call processing, the ISCP could also analyze the dialed destination data to determine if the subscriber has authorized the particular call. The ISCP would instruct the central office to terminate or compete the call based on whether the dialed digits of the call meet the subscriber's criteria. For example, the database would store data as to what if any long distance calls might be permitted.

In the above described implementation, the subscriber turns on the service by inputting data into the ISCP database setting up a product code, a password and a time interval for activation. Either as an alternative or in addition to the product code and password approach, the system could allow the subscriber to toggle on the communication service to the lines for a set time. With this approach, the representative of the subscriber calls in and simply inputs the on-time and off-time information. When a caller takes a telephone connected to one of the subscriber's lines off-hook, the local office sends a query to the ISCP. If the service is active at that time, the ISCP sends back an instruction for the local office to play a dial tone, and the call is processed in the normal manner or using the product code and password discussed above, depending on how the particular subscriber has chosen to set up its own service. If the ISCP determines that the service is not active at the time of the off-hook, the ISCP sends back an instruction for the local office to play an announcement, for example stating that service is restricted and the line is not available for service at this time.

The present invention can use an interactive DTMF procedure to enter the information to activate the service for the particular subscriber's lines. In such an implementation, a representative of the subscriber would dial a specified number to initiate programming. The system would provide the caller with a prompt and the caller would respond by entering an identification number indicating that the caller is a person authorized to activate the subscriber's hold room service. The ISCP would analyze the dialed DTMF identification number to identify the subscriber's data files and the authorized caller.

If the caller passes the security checks, the system would proceed with an interactive session, providing prompts to the caller and receiving DTMF inputs, whereby the caller enters data to change the subscriber's data table as currently stored in the database. The interactive routine would mirror the call processing routine for the particular subscriber.

In another implementation, the system would accept voice inputs of the caller's identification number and the programming data as an alternative to the DTMF inputs discussed above. As a further alternative, subscribers may obtain the requisite access to the database in the ISCP via a Personal Computer, a data terminal or some other form of work station.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
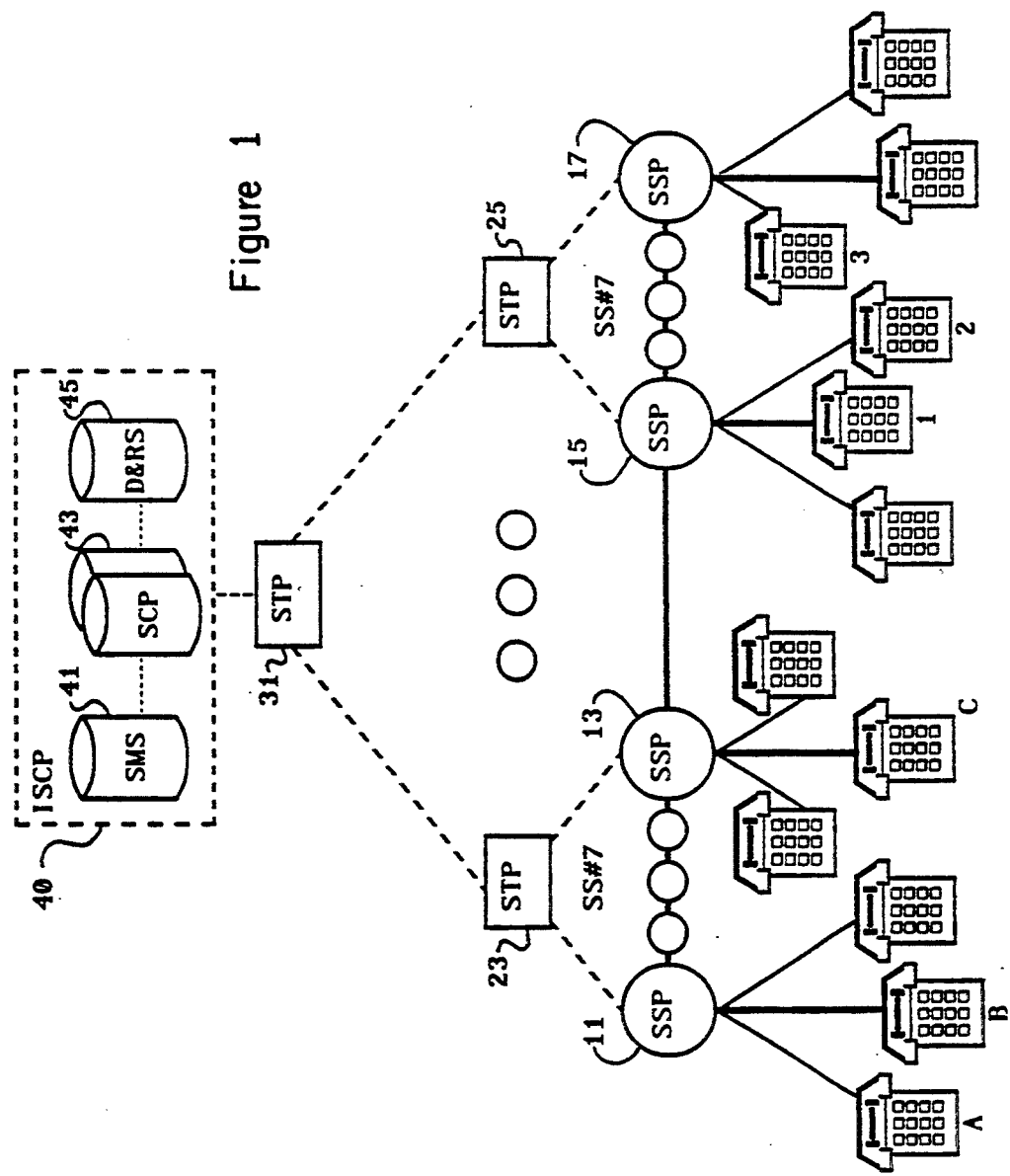
FIG. 1 is a schematic block diagram of the components of an Advanced Intelligent Network system of the first embodiment of the system for implementing the invention.
Figure 1A:
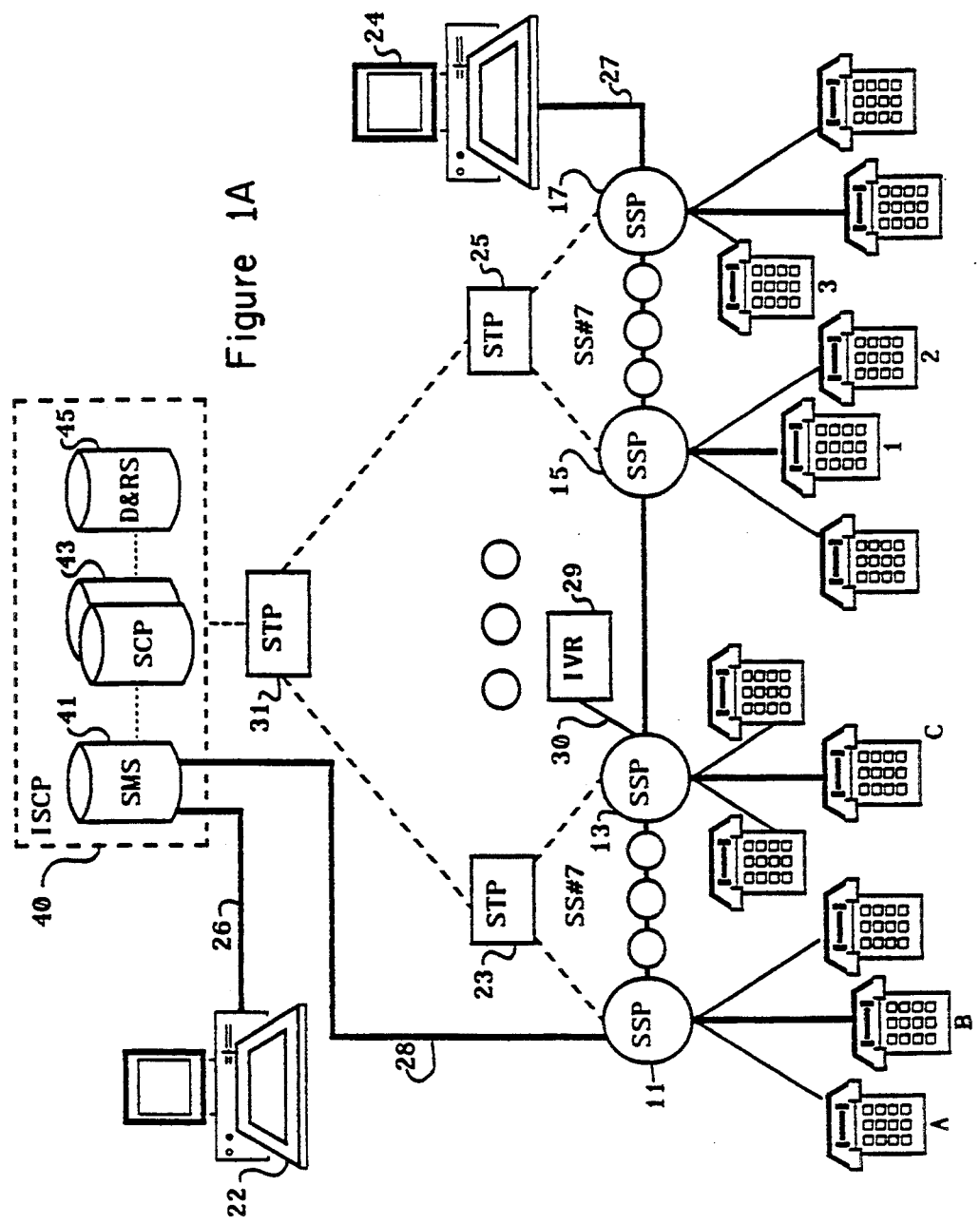
FIG. 1A is a schematic block diagram showing an Advanced Intelligent Network system, similar to FIG. 1, which also includes several additional components facilitating different types of subscriber data entry.

FIGS. 1 and 1A illustrate preferred telephone network architectures for providing the various service and restriction controls of the present invention. A number of other network architectures can also be used, as discussed in more detail later.

In the system shown in FIG. 1, each of the central office switching systems are labeled as an "SSP." The Service Switching Points, referred to as SSP's, are appropriately equipped programmable switches present in 'the telephone network, which recognize AIN type calls, launch queries to the ISCP and receive commands and data from the ISCP to further process the AIN calls.

As shown in FIG. 1, all of the central office switches 11, 13, 15 and 17 are equipped and programmed to serve as SSP's. Such central office switching systems typically consist of a programmable digital switch with CCIS communications capabilities. One example of such a switch is a 5ESS type switch manufactured by AT&T; but other vendors, such as Northern Telecom and Seimens, manufacture comparable digital switches which could serve as the SSP's. The illustrated embodiment is perhaps an ideal implementation which would make a variety of Advance Intelligent Network AIN services widely available at the local office level throughout the network. As will be discussed later, other AIN implementations provide the SSP functionality only at selected points in the network, and end offices without such functionality forward calls to one of the SSP's.

The SSP's 11 and 13 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. The central offices or SSP's are interconnected to each other by trunk circuits (illustrated in FIG. 1 as bold lines) for carrying telephone services.

The local area STP's 23 and 25, and any number of other such local area STP's shown as black dots between STP's 23 and 25 communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. The links between the central office switching systems and the local area STP's 23 and 25 are typically SS#7 type CCIS interoffice data communication channels. The local area STP's are in turn connected to each other and to the regional STP 31 via a packet switched network. The regional STP 31 also communicates with the ISCP 40 via a packet switched network.

The above described data signalling network between the SSP type central offices and the ISCP is preferred, but other signalling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability as will be discussed in more detail later.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits.

There could be one or more ISCP's per state, to avoid overloading existing CCIS data links. Alternatively, the ISCP could be implemented on a LATA by LATA basis or on a regional operating company basis, i.e. one data base for the entire geographic area serviced by one of the Regional Bell Operating Companies. In fact, if federal regulations permitted, the data base service could become nationwide.

As shown in FIG. 1, the ISCP 40 is an integrated system. Among other system components, the ISCP 40 includes a Service Management System (SMS) 41, a Data and Reporting System (D&RS) 45 and the actual database referred to as a Service Control Point (SCP) 43. The ISCP also typically includes a terminal subsystem referred to as a Service Creation Environment or SCE (not shown) for programming the data base in the SCP 43 for the services subscribed to by each individual business customer.

Although shown as telephones in FIG. 1, the terminals can comprise any communication device compatible with the line. Where the line is a standard voice grade telephone line, for example, the terminals could include facsimile devices, modems etc.

Each central office switching system or SSP normally responds to a service request on a local communication line connected thereto, for example an off-hook followed by dialed digit information, to selectively connect the requesting line to another selected local communication line. The connection can be made locally through only the connected central office switching system. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnecting the two central office switches.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited trunk capacity. The CCIS system through the STP's was developed to alleviate this problem.

In the CCIS type call processing method the local central office suspends the call and sends a query message through one or more of the STP's. The query message goes to the central office to which the called station is connected, referred to as the "terminating" central office; for example, for a call from station A to station C the query would go from originating SSP 11 to terminating SSP 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations. In an AIN type network system implementing the present service activation and call restriction type features, these normal call processing routines would still be executed for completion of calls between customer stations not subject to the relevant service restrictions and for completing calls originating from the commercial subscriber's restricted group of lines, when services to those lines is on and if necessary when the caller has entered correct access authorization data.

In an Advanced Intelligent Network (AIN) type system, such as shown in FIG. 1, certain calls receive specialized AIN type processing under control of data files stored in the SCP database 43 within the ISCP 40. In such a network, the SSP type local offices of the public telephone network detect a call processing event identified as an AIN "trigger". For ordinary telephone service calls, there would be no event to trigger AIN processing; and the local and toll office switches would function normally and process such calls as discussed above, without referring to the SCP database for instructions. An SSP office which detects a trigger, however, will suspend call processing, compile a TCAP formatted call data message and forward that message via a common channel interoffice signalling (CCIS) link and STP(s) to the ISCP 40 which includes the SCP database 3. If needed, the ISCP can instruct the central office to obtain and forward additional information. Once sufficient information about the call has reached the ISCP, the ISCP accesses its stored data tables to translate the received message data into a call control message and returns the call control message to the office of the network via CCIS link and STP(s). The SSP then uses the call control message to complete the particular call through the network. The present invention allows a commercial subscriber to interact with the SCP database maintained in the ISCP, to establish and modify various criteria to activate and/or restrict communication services provided on a group of the subscriber's telephone lines and to control routing of calls from those lines.

The SSP type switches can recognize a variety of events as triggers for activating a query and response type AIN interaction with the ISCP. A number of different AIN triggers can be used in accord with the present invention. For example, the system could use an "off-hook delay trigger". With this type of trigger, the SSP provides standard switch dial tone on the off-hook line to the caller and collects dialed destination digits. The SSP, recognizing that the call originates on one of the lines of the subscriber's group would then launch the TCAP initial query to the ISCP. The system could also operate on an Individual Dialing Plan trigger (off-hook followed by dialing of three or four numbers-similar to dialing an extension number) or an Office Dialing Plan access code trigger (off-hook followed by dialing of an identified access code such as *66 or 8).

The preferred embodiment uses an off-hook immediate trigger to initiate AIN type call processing. Specifically, when a person picks up the handset of a telephone connected to one of the lines of the group, the SSP connected to that line accesses its translation tables and recognizes that line is subject to AIN processing. The SSP does not provide dial tone at this time. Instead, the SSP launches a TCAP query through the STP to the ISCP. This TCAP query contains a substantial amount of information, including data identifying the off-hook line and the current time. The ISCP uses the line identification to access the subscriber's data file within the SCP database. From this data, the ISCP determines what action to take next.

Exemplary Call Processing Routine

The present invention can process the calls from each subscriber's identified group of lines in a variety of different ways, and each subscriber can choose and control the processing of calls from their own lines as they see fit. One example of a call processing routine will be discussed below.

By way of example, it will be assumed that a particular subscriber is an airline company that operates a courtesy lounge for its passengers. Station sets 1 and 2 are located in the lounge. Furthermore, we will assume that the airline wants the telephone service active on those lines for a period of time and usually wants to limit use during that period to passengers scheduled on a delayed flight. The airline has elected to use an authorization code procedure. The authorization code could be input at some point prior to dialing in the destination digits. For purposes of this example, however, it will also be assumed that the subscriber wishes to permit dialing of the destination number before requiring input of the authorization code. The airline will tell passengers on the delayed flight that after dialing the destination number they will need to input their flight number (product code) and a password given to the passengers by the airline. The password can be any arbitrary code selected by the airline subscriber to insure that only its passengers can use the group of lines in the courtesy lounge. For example, the airline might choose to use the date of the flight or a number from 1 to 7 for the day of the week of the flight, as the password.

FIG. 2 provides a sample of a call processing routine in accord with the present invention essentially corresponding to the airline courtesy lounge example set forth above. Other call processing routines can be used. In particular, the call processing routines can be customized to a substantial extent for different subscriber by storing different data for each subscriber in the SCP database 43. For example, a different subscriber may choose to require input and validation of the authorization code prior to dialing the destination number. Also, the example of FIG. 2 uses an off-hook immediate type trigger, but the processing can easily be modified to use other types of AIN triggers as discussed above.

The specific example of call processing will now be discussed with reference to the flow chart shown in FIGS. 2A to 2D. Call processing begins at step S1 when a party takes a telephone set or other line connected equipment off-hook. The SSP connected to the particular telephone line will detect this condition. At step S2, that SSP will examine its translation tables for the off-hook line and determine if that line is a member of a subscriber's group. Essentially, the SSP determines if the off-hook on this particular line is an "off-hook" trigger for activating AIN query and response procedures. If the decision at step S2 indicates that the line is not a member of an identified group of lines, the SSP executes its normal call processing routines (step S3) and the call is completed (step S4) in the normal manner. If the decision at step S2 indicates that the line is a member of an identified group of line, i.e. that the off-hook line is one of the lines connected to the station 1 and 2, in the subscriber's courtesy lounge, the SSP 15 advances to step S5 to initiate AIN type processing.

At step S5, the SSP 15 sends a TCAP 'Query' message to the ISCP 40 via the STP(s) and the various data links, as shown in FIG. 1. The Service Key portion of the TCAP query will include Automatic Number Identification (ANI) data identifying the off-hook line, and the ISCP uses this identification data to access the particular subscriber's data files in the SCP database 43. The ISCP examines the subscriber's data file. At step S6, if the subscriber has elected not to toggle the service for the off-hook line, processing skips the next decision and proceeds to step S11, which will be discussed below.

If the subscriber has programmed in a toggle function, processing moves from step S6 to step S7 wherein the ISCP next determines if the subscriber has turned the service to the line on. This could require simply checking one bit in the subscriber's data file to determine if the service is on or off. In preferred embodiments, the subscriber could program in on and off times for the service. The initial TCAP query message includes a time stamp indicating the time when the call was initiated. If the subscriber has set on and off times, the ISCP compares the time stamp to the on and off-times to determine if the call was initiated during the period when the subscriber wants the service on.

If the decision in step S7 indicates that the service is not on, the ISCP sends a TCAP return result message via the STP(s) instructing the SSP to play a 'Terminate' announcement (step S8). The SSP plays the announcement identified in this latest TCAP message (Step S9). The announcement can be a tone signal or a voice message saying that service is not available at this time. In response, the calling party will hang up and processing ends at step S10.

As noted above, if the subscriber did not have a toggle function for controlling service to the particular line, process flow extended from step S6 to step S11. Processing also alternately flows to step S11 if the decision at step S7 indicated that service to the off-hook line was currently on. At step S11, the ISCP sends a TCAP 'Invoke' message to the SSP via the STP(s). An Invoke message instructs the SSP to play an identified announcement and collect a specified number of digits up to fifteen. In this case, the message identifies a dial tone as the announcement and instructs the SSP to collect up to fifteen digits.

At step S12, the SSP connects the off-hook line to an announcement trunk or platform within the SSP switching office, to place a dial tone on the off-hook line. Although provided as an announcement, to the person attempting to use the line this sounds like normal central office dial tone. In response, the person will dial in destination digits in the normal manner. The SSP collects digits until it receives the maximum number of fifteen digits or until a time limit expires after the last digit received from the caller indicating that the caller has stopped dialing digits. The SSP will send another TCAP message including the dialed destination digits to the ISCP via the STP(s) (step S13). At step S14, the ISCP examines the number of digits dialed.

Figure 2A:
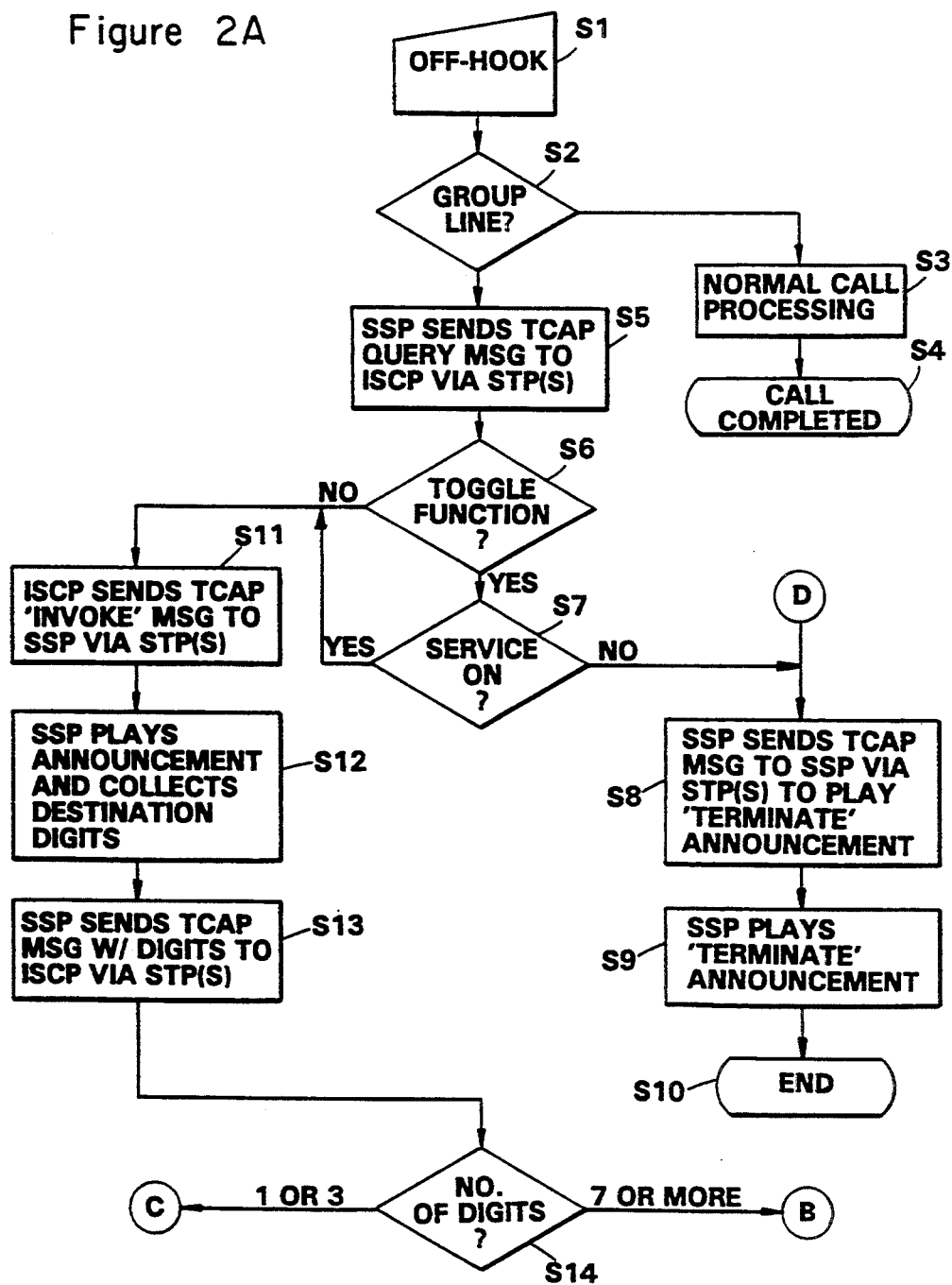
FIGS. 2A to 2D form a flow chart depicting one example of call processing in accord with the present invention.
Figure 2B:
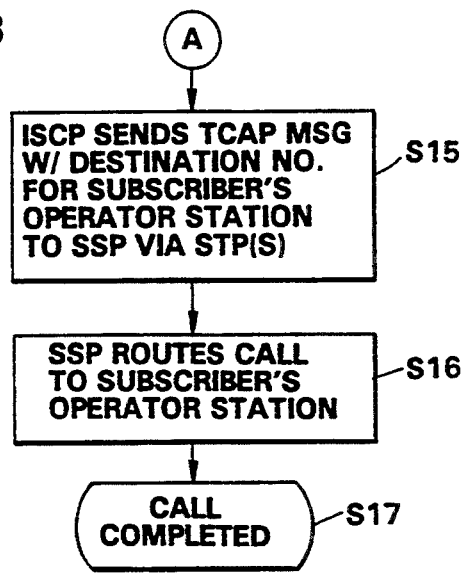

If the person using the line dialed only 1 or 3 digits, for example, "0", "411" or "911", the call is to be routed to the subscriber's own operator. Thus, if the decision at step S14 indicates that the caller dialed only 1 or 3 digits, processing flows to step S15 (FIG. 2B). At step S15, the ISCP send a TCAP message to the SSP via the STP(s). This message includes a destination number for a private operator station line assigned to the subscriber. The SSP uses the received destination number to execute otherwise normal call routing procedures to route the call through the network to the subscriber's operator station (step S16). At step S17 the call is completed to the operator station, and the person using the line can carry on a conversation with the subscriber's operator.

Figure 2D:
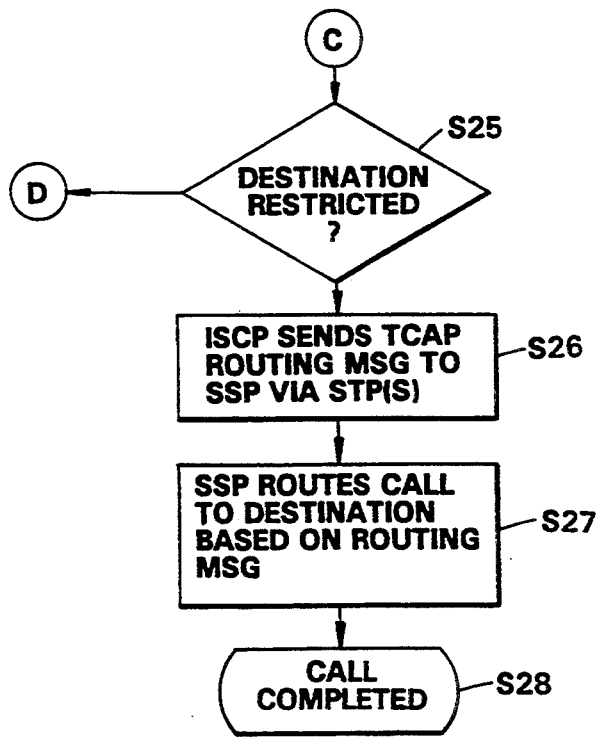

If the decision at step S14 indicated that the person using the off-hook line dialed 7 digits or more, the person apparently is attempting to make a local call, a long distance call or an international call. Processing therefore extends to step S18 shown in FIG. 2C. At step S18, if the particular subscriber has selected to have no authorization code procedure or has input data to temporarily override the authorization code procedure, then processing branches to step S25 (FIG. 2D).

If an authorization code procedure is necessary, step S8 causes call processing to branch step S19. At this next step, the ISCP sends a TCAP 'Invoke' message to the SSP via the STP(s). In this case, the Invoke message identifies an announcement signifying a request for input of authorization digits and instructs the SSP to collect the appropriate number of digits for the particular subscriber's authorization code procedure. The message can be a synthesized speech announcement, if a customized message is available from a peripheral announcement platform, or the announcement can be a subsequent dial tone if the SSP must provide the announcement itself.

At step S20, the SSP connects the off-hook line to an announcement trunk or platform to place the announcement identified in the TCAP Invoke message on the off-hook line and then collects the specified number of digits. The SSP then sends another TCAP message including the dialed authorization code digits to the ISCP via the STP's (step S21). The ISCP will next execute a series of steps to check the code for validity and to determine if service is currently available.

In the preferred embodiments using an authorization code procedure, the authorization code includes a "product code" and a "password". As used herein, the product code corresponds to some information identifying a particular product or service offered by the subscriber. The product code could be a model number for a particular item sold by the subscriber, for example the model number of a car, a washing machine or a refrigerator. The product code could also identify a service, and in the present example the product code would be one of the airline subscriber's flights. The "password" is an arbitrary code which the subscriber will then give only to persons the subscriber wishes to have access to the service. Typically, airline flights of a given number repeat periodically, e.g. daily or weekly. Therefore, if the subscriber is an airline, the added password might be a date for the one flight which is actually subject to a delay.

The customer using the line dials in a string of digits, e.g. eight digits long, and the SSP central office sends the dialed authorization code data as a single string of digits containing both the product code and the password. When the ISCP validates a received product code and password, it actually breaks the received digits down into two pieces and processes the product code and password separately. The ISCP first checks to see if the subscriber's table in the data base currently includes the received product code, e.g. that the airline actually has entered data for a delayed flight identified by the received product code. If the product code is invalid, the ISCP sends a message instructing the central office to connect the call to an announcement telling the caller that the call can not be completed as dialed.

Figure 2C:
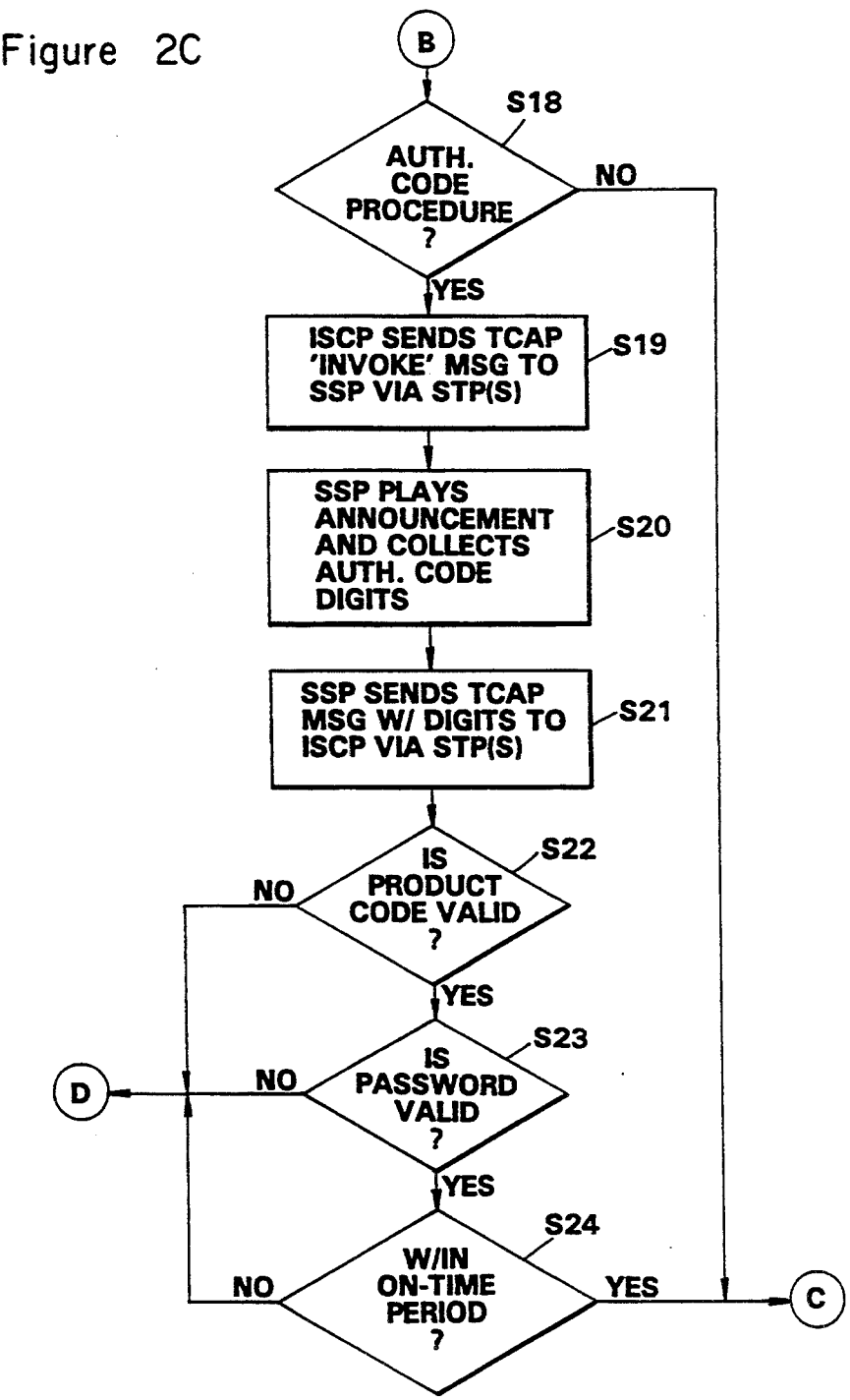

With specific reference to the call processing example in FIG. 2C, the ISCP first checks the validity of the product code first (step S22). In the airline example, the product code would correspond to the flight number (four digits) of a delayed or cancelled flight, and the ISCP would check to determine if the subscriber has listed the particular four digits entered by the caller in the flight number portion of the subscriber's data table in the SCP database 43. If the product code is valid, the ISCP then proceeds to step S23 and checks to see if the password is in the data table. In the airline example, the ISCP checks to see if the date currently is recorded in the airline's table and corresponds to the received flight number.

If the password is valid, the ISCP proceeds to step S24 to determine if the call was initiated during the on time period, defined by the subscriber, for the particular product or service (e.g. the particular delayed flight). A typical TCAP query from an SSP central office to the ISCP, such as sent in step S5, will include a time "stamp" indicating the time of the call. In step S24, the ISCP checks the time stamp for the present call against data stored in the airline's table indicating the on and off times for activating the communication service related to the particular flight. If the call occurs during the on time interval, the ISCP proceeds to step S25 shown in FIG. 2D.

If any of the decisions in steps S22, S23, and S24 produced a negative result, i.e. if the product code is not valid, if the password is not valid, or if the call occurs outside of the relevant on-time interval, processing flows back to step S8. As discussed earlier, the ISCP will send a message instructing the SSP type central office to connect the call to the 'Terminate' announcement telling the caller that the call can not be completed (step S8). The SSP will play the 'Terminate' announcement (step S9). In response, the calling party will hang up and processing ends at step S10.

Processing reaches step S25 in FIG. 2D either because the subscriber elected to skip the authorization portion of the call processing routine (from step S18) or after both portion of the authorization code and the time of the call have been validated (from step S24). The present invention can also allow the subscriber to define restrictions on what types of calls can be made from the identified group of the subscriber's lines. Different subscribers can choose to restrict calls in different ways. For example, the calls can be restricted essentially the same way at all times. Many subscribers, however, may prefer to program in restriction criteria in essentially the same way as they will program in the product code and password. For example, the SCP database 43 would store data as to what if any long distance calls might be permitted for calls at a certain time and/or using a certain product code. In the airline context, if the delayed flight were going to London, this stored restriction data might permit local calls and only long distance calls to England.

In step S25, therefore, the ISCP examines the dialed destination digits (received in step S13) and the subscriber's file in the database to determine whether or not the call is directed to a restricted destination. Specifically, the ISCP checks to see if the subscriber has established any restriction criteria, and if so, the ISCP checks to see if the call meets those criteria. If the decision in step S25 indicates that the destination digits identify a restricted call, processing flows back to step S8. Again, at this point the ISCP will send a TCAP message instructing the central office to connect the call to the 'Terminate' announcement telling the caller that the call can not be completed (step S8). The SSP will play the 'Terminate' announcement (step S9). In response, the calling party will hang up and processing ends at step S10.

If the decision in step S25 indicates that the destination digits do not identify a restricted call, the ISCP sends a TCAP routing message to the SSP via the STP(s). This routing message is essentially similar to the message transmitted in step S15. Both messages include a destination number and routing control information (as discussed below). In the message used in step S26, however, the destination number essentially corresponds to the number dialed in by the person attempting to use the subscriber's line. In response to the routing message, the central office resumes call processing and routes the call through the network to the dialed destination (step S27), in essentially a normal manner. At step S28, the call is completed to the dialed destination station.

In either step S15 or step S26, the TCAP message from the ISCP includes data fields for instructions to route the call over specified trunk circuits or trunk groups. The subscriber therefore can populate corresponding data files in the subscriber's table in the SCP database 43, and the ISCP will insert the relevant instructions into the TCAP message sent back to the SSP to route the call. These instructions can be used to route calls over privately owned or leased trunk facilities, particularly where the ISCP determines that the desired call is an inter-LATA or international call.

In one example, the routing control information stored in the SCP database 43 would specify three trunk groups, in priority order. For example, the first trunk group might be a group of private tie lines, the second trunk group might be AT&T WATS lines and the third might be through MCI trunk lines. Upon receiving the TCAP response message including the destination number and the identification of the three trunk groups in priority order, the central office would use the highest priority trunk group then available to complete the call, and if all specified trunk groups are busy, complete the call through the standard direct dial telephone network.

The present system can provide subscribers other types of routing control routines, as desired by each subscriber. Instead of specifying priority order, the stored data might identify different trunk groups for use at different times of day. Based on the current time, the ISCP would send a TCAP response message identifying a single trunk group, and the switch would then use that trunk group to complete the call. Also, instead of specifying private trunk groups, such as tie lines, the stored routing data could specify one or more trunk groups, or even individual trunk circuits, through the public switched telephone network itself. The programmability of the customer's stored data allows each customer a virtually unlimited selection of routing control routines, so that each business subscriber can customize its routing control to optimize use of its available trunk resources.

In the above described implementation, the airline subscriber can turn on the service by inputting data into the SCP database setting up a product code, a password and a time interval for activation. The specific product codes and passwords each subscriber uses are entirely defined by the subscribers, as discussed in more detail below. As shown in the flow chart, either as an alternative or in addition to the product code and password approach, the system subscriber can enter data to toggle on the communication service to the lines for a set time. The subscriber can also define restrictions on what types of calls should or should not be completed and can establish call routing procedures to minimize cost to the subscriber and/or to take maximum advantage of the subscriber's trunk circuit resources.

The present system can provide the subscriber with Station Message Detail Reports (SMDR) for all calls made from the identified group of the subscriber's lines. If the subscriber uses a product code and password, the message detail reports can indicate which calls used each product code and/or password. The detail recording can be performed, for example, by the ISCP 40. The precise detail recording can be controlled by data in the SCP database, therefore each subscriber can receive customized reports.

Each TCAP query includes a Service Key portion which identifies the telephone number of the off-hook line. Each central record is driven by a telephone number. Thus, every time an SSP makes a query to the ISCP and the ISCP responds, the Data and Reporting System (D&RS) 45 in the ISCP 40 captures the data and stores an appropriate record of the transaction in a record corresponding to the telephone number of the subscriber's line from which the call originated. The time of initiating the service request is known from the time of receipt of the query, i.e., by subtracting the known maximum period for transmission of the query from an SSP to the ISCP from the time of receipt or, the query. The D&RS 45 can record call disposition based on what final response the ISCP sent back to the originating SSP type central office. The record therefore will indicate when a customer requested communication service, what line the customer used, the product and password used, where the customer called and precisely how the ISCP instructed the SSP to dispose of the call.

If the call duration is to be included in the SMDR reports, the D&RS must also capture information indicating the time of termination of the call. The SSP type switch could be programmed to provide a further message to the ISCP upon completion of each call from a line in the subscriber's group. The further message would be routed to the ISCP in the standard manner but would indicate the time that the call or service terminated.

The SMDR reports could be provided in the form of printouts mailed to the customer on a specified periodic basis. Alternatively, each commercial subscriber could have one or more data terminals set up to receive the reports over a data link to the D&RS 45 within the ISCP, for example via modems and dial up telephone lines. If data terminals are used, data in the SCP might also specify the time and telephone number to deliver the reports to each subscriber's own terminal.

It is also possible to use a number of other systems for providing detailed reporting of all calls made from the identified group of the subscriber's lines.

Subscriber Data Input

A subscriber's service is initially set up by a telephone company technician using the Service Creation Environment or SCE (not shown) in the ISCP 40. As part of this procedure, the technician establishes one or more data tables for the subscriber in the SCP 43. The format of the data tables would be defined by the types of data needed to control the service in the manner selected by the particular subscriber. Any control data which the subscriber wants to apply as fixed data to all calls would also be input by the technician using the SCE. Subsequently, the subscriber's representative would actually control the service by inputting data to populate the subscriber's data table(s) using one of the techniques discussed below.

One implementation for receiving inputs from the subscriber uses an interactive voice and DTMF input type access procedure. The subscriber would dial a specified number to initiate programming, for example a seven digit number such as 550-0211. The call could be routed through the network to a dial up telephone line connected to an appropriate automated voice response system (not shown in FIG. 1) coupled to the SMS 41 in the ISCP 40. The voice response system would provide synthesized speech prompts and accept DTMF inputs to allow the subscriber's representative to enter the time, or authorization code data or the like to activate the service on the subscriber's lines and control call restrictions and/or call routing.

Figure 3A:
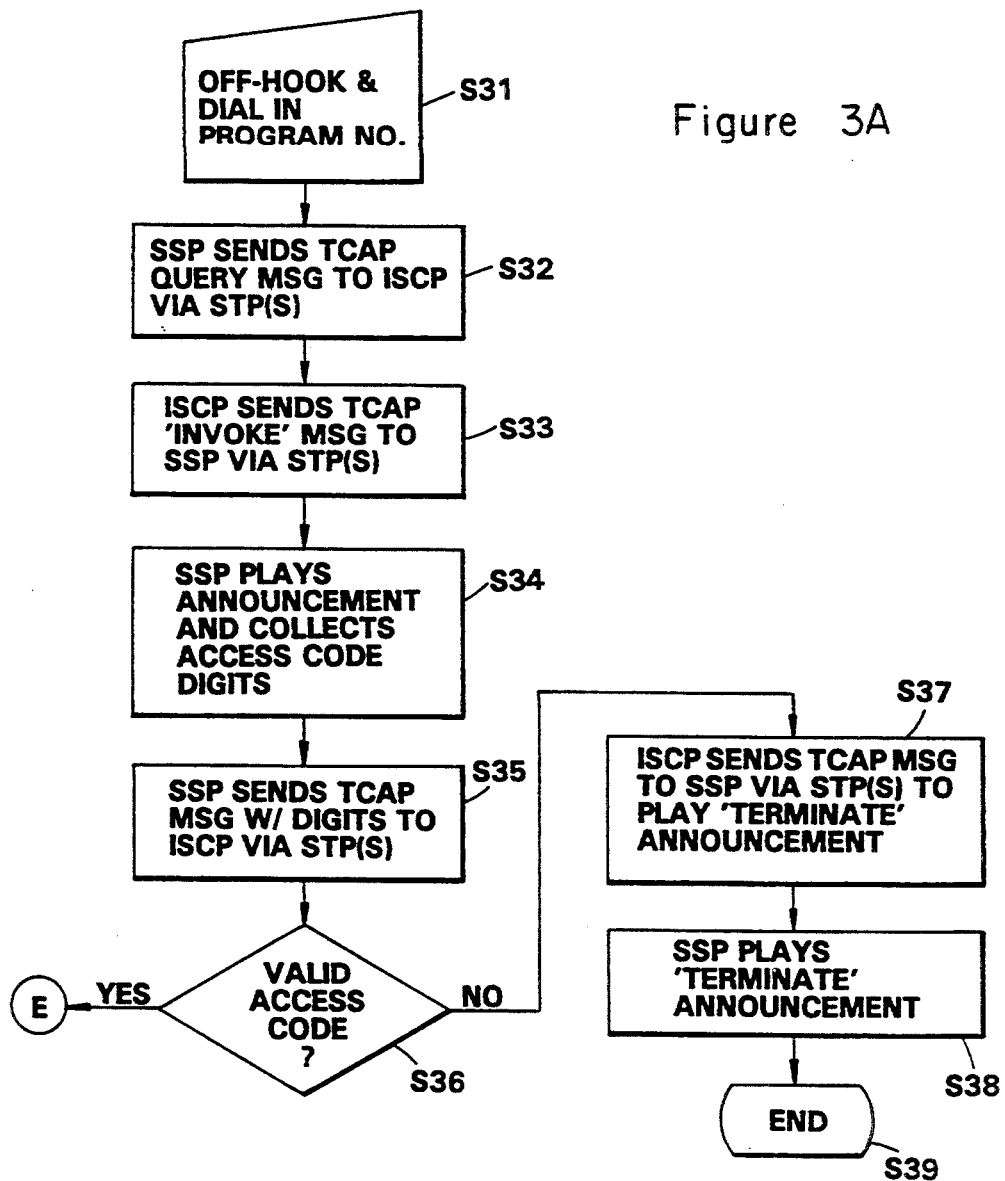
FIGS. 3A and 3B form a flow chart illustrating an interactive procedure for DTMF input of a subscriber's control data.
Figure 3B:
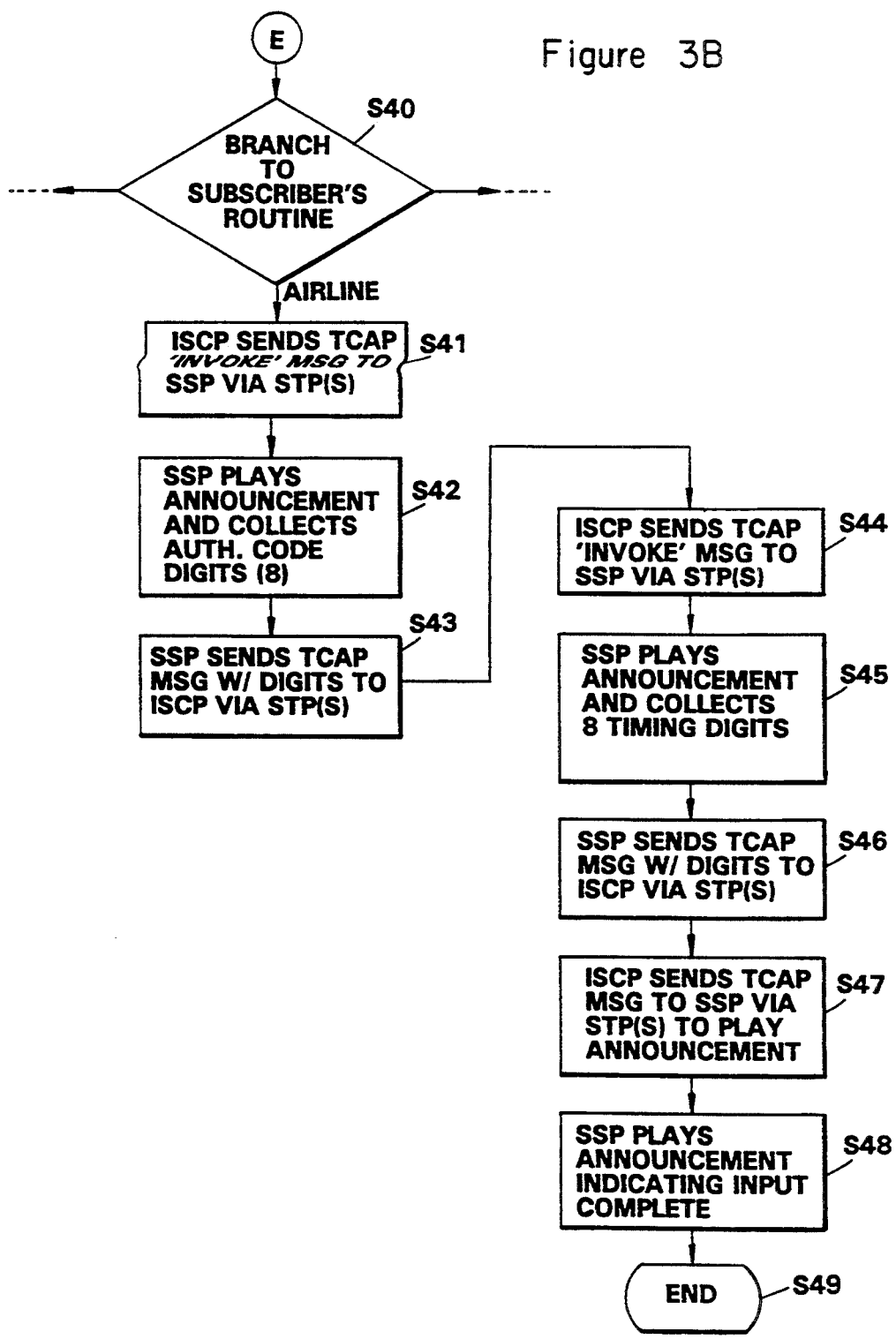

In the preferred implementation of FIG. 1, the SSP connected to the line could interpret this dialed number as an AIN trigger and respond to instructions from the ISCP to provide announcements to the caller and forward dialed digits and Automatic Number Identification (ANI) data to the ISCP as TCAP messages. FIGS. 3A and 3B together form a flow chart showing a simplified example of a routine for inputting the subscriber data, using an interactive DTMF input procedure and the preferred network architecture of FIG. 1.

At step S31, the subscriber's representative would take a standard telephone station, for example station set A, off-hook and dial the assigned programming telephone number (e.g. 550-0211). In this implementation, the programming number is not an actual telephone number. The programming number is a virtual number for which the network has no actual equipment connected to any particular line.

The connected SSP collects digits and recognizes the dialed programming number as an AIN trigger (destination number type trigger). The SSP therefore would respond to the off-hook and dialing of the programming number by launching an initial TCAP query at step S32 to the ISCP via the STP(s). This initial query would include the dialed digits and an identification of the line from which the representative initiated the call.

The ISCP would recognize the dialed digits as a request for subscriber input of service programming data. A number of different approaches can be used to identify the particular subscriber. Each subscriber to this service might have a different number to dial and/or the representative might be required to dial in from a telephone line assigned to the particular subscriber. The ISCP therefore identifies the particular subscriber from the dialed digit data and/or the off-hook line identification data included in the TCAP query message. The ISCP then accesses the particular subscriber's data files in the SCP database 43.

At step S33, the ISCP sends a TCAP 'Invoke' message to the SSP via the STP(s). The Invoke message instructs the SSP to play an identified announcement and collect a specified number of digits up to fifteen. In this case the announcement would serve as a prompt instructing the subscriber's representative to input access code data, typically a representative's personal identification number. If the SSP has access to a peripheral announcement platform having extensive voice massaging capabilities, the announcement could be a synthesized speech message. Alternatively, the announcement could take the form of a subsequent dial tone signal.

In response to the Invoke message, the SSP connects the off-hook line to an announcement trunk or platform to place the announcement identified in the TCAP Invoke message on the off-hook line and then collects digits from the caller (step S34). If the caller is the subscriber's representative, she dials in a personal identification number or other access code indicating she is authorized access to the particular subscriber's data. The SSP then sends another TCAP message including the dialed access code digits to the ISCP via the STP's (step S35).

At step S36, the ISCP checks the received access code digits against one or more access codes in the subscriber's table in the SCP database 43. If the received code is valid, processing flows to step S40 (FIG. 3B), as will be discussed below. If the received code is not valid, however, processing flows to step S37. The ISCP sends a TCAP message via the STP(s) instructing the SSP to play a 'Terminate' announcement (step S37). The SSP plays the announcement identified in this latest TCAP message (step S38). The announcement can be a tone signal or a voice message saying that the call can not be completed as dialed. In response, the calling party will hang up and processing ends at step S39.

From the subscriber's data files, the ISCP determines what data is necessary for programming of a particular subscriber's services. Thus, if the decision in step S36 indicated that the received code is valid, the ISCP will proceed with execution of a procedure to enter the data necessary for control of the particular subscriber's call processing routine. As such, the succeeding steps essentially mirror steps of the subscriber's call processing routine. In step S40, therefore, the processing branches to execute the data input routine appropriate for the identified subscriber. This branching may involve a branch to a totally different routine for each subscriber. In the present example, processing branches to a routine for input of the airline subscriber's information.

A simplified version of the airline courtesy lounge example discussed above will be used for purposes of further discussion. It will be assumed here that the airline subscriber wants to program in product code data (a flight number) and a password (e.g. a date of a delayed flight). To activate the service to the group of lines, the subscriber inputs the product code and password. The group of lines all are identified in advance, and the airline has elected not to further select individual lines during the data input procedure. Also, the routing control information has been entered in advance by the telephone company technician in response to a service request by the airline.

At step S41, the ISCP sends another TCAP 'Invoke' message to the SSP via the STP(s) instructing the SSP to play an announcement and collect digits. Again, this announcement may be a synthesized speech message, and here the message would request input of authorization code data. Alternatively, the announcement would can be a tone signal which the subscriber's representative knows is a request to input authorization code data. In response to the Invoke message, the SSP connects the line to an announcement trunk or platform to place the announcement identified in the TCAP Invoke message on the off-hook line and then collects digits from the caller (step S42). For the airline, the authorization code would include a four digit product code corresponding to one of the airline's flight numbers. The authorization code would also include a four digit expression of the day of the year (e.g. 1208 for December 8th). The SSP next sends another TCAP message including the dialed authorization code digits to the ISCP via the STP's (step S43).

At step S44, the ISCP sends another TCAP 'Invoke' message to the SSP via the STP(s) instructing the SSP to play an announcement and collect digits. Again, this announcement may be a synthesized speech message or a tone signal. In this case the announcement prompts the subscriber's representative to enter the requisite timing data.

In response to this Invoke message, the SSP connects the line to an announcement trunk or platform to place the announcement identified in the TCAP Invoke message on the line and then collects digits from the caller (step S45). For the airline, the timing data would include four digits representing an on-time in military notation (e.g. "1415" for 2:15 PM) followed by four digits representing an off-time in military notation (e.g. "1515" for 3:15 PM). The SSP next sends another TCAP message including the dialed timing data digits to the ISCP via the STP's (step S46).

The ISCP stores the received data in the subscriber's files and sends a TCAP return result message via the STP(s) instructing the SSP to play an announcement indicating that data input is complete (step S47). The SSP plays the announcement identified in this latest TCAP message (Step S48). In response, the calling party will hang up and processing ends at step S49.

If the desired control of particular subscriber's service requires additional data inputs, the system would repeatedly prompt the subscriber's representative and collect appropriate numbers of digits (e.g., by repeating steps similar to steps S41–S43 and/or steps S44–S46). Such additional input data collection might allow a subscriber to specify call restriction data, for example by inputting area codes or international country codes for long distance calls which the subscriber wants to permit. This extended input routine might also collect information identifying what trunk groups to route calls over. The amount of data input and the meaning thereof will vary from subscriber to subscriber, depending on how each subscriber chooses to set up and control the service on the subscriber's group of lines.

Although not shown in the flow chart, the ISCP will verify received data inputs from the subscriber's representative to insure that they meet the requirements for controlling the particular subscriber's call processing routine. If errors are found, for example if the caller entered only seven digits at a point where eight were expected, the system could provide an error message and prompt again for input of the relevant data. If the system has synthesized speech massaging facilities, the system can also provide confirmation messages repeating back the received data and requesting dialing of a confirmation code, such as depression of the '#' key.

In each DTMF routine discussed above, as part of the interactive procedure the subscriber would enter an identification number indicating that the particular calling party is authorized access to the subscriber's data. The ISCP would receive and use the dialed DTMF identification number to identify the subscriber's data files.

FIG. 1A illustrates several alternatives for receiving subscriber inputs and transferring input data for storage in the SCP database 43. Different subscribers may access the system using different means, and/or one subscriber may access the database one way one time and a different way at other times.

A first alternative shown in FIG. 1A shows a further voice responsive arrangement for receiving subscriber input data. As illustrated, a line 30 connects an Interactive Voice Response (IVR) unit 29 to one of the SSP's 13. When the subscriber dials the specified number to initiate programming, the call is routed through the network to the line 30 and the IVR unit 29. Unlike the automated voice response implementation discussed briefly earlier, however, IVR unit 29 is not coupled directly to the SMS 41 in the ISCP 40.

The IVR unit 29 would store a script for conducting a customized interactive input procedure for each particular subscriber. The IVR unit would provide customized synthesized speech prompts and accept DTMF inputs to execute an authorization procedure and to allow the authorized subscriber's representative to enter the time data, authorization code data or the like to activate and control the telephone service on the subscriber's lines. The routine for entering data would be essentially a mirror image of the service the particular subscriber has subscribed to. For example, if the subscriber wants to the service turned on and off at certain times, the Interactive Voice Response unit 29 would sequentially prompt the caller with messages directing the caller to enter one of the relevant inputs and then an appropriate DTMF input. As a further modification, the IVR unit 29 could include voice recognition means to accept verbal data inputs.

Through the above discussed interactive procedure, the IVR unit 29 will collect all necessary information from the subscriber's representative, after which the representative hangs up. The IVR unit 29 will then dial a virtual number indicating its need to transfer data to the ISCP 40. The SSP 11 will recognize the dialed virtual number as an AIN trigger and will initiate a query and response routine with the ISCP similar to that discussed above with regard to FIGS. 3A and 3B. The initial TCAP query will indicate the identity of the line 30 going to the IVR and the dialed virtual number. Using this information, the ISCP will determine that the present call relates to input of subscriber information. The ISCP therefore instructs the SSP to collect digits. The IVR unit 29 dials in up to fifteen digits, relating to the latest subscriber input, and the SSP 13 transfers that data in a further TCAP message to the ISCP. The ISCP may identify the particular subscriber from a portion of the virtual number dialed by the IVR unit or from digits transferred in the subsequent TCAP message to the ISCP. Based on the format of data needed to activate services for the particular subscriber, the ISCP and the SSP 13 repeat this digit collection sequence until all of the subscriber input data has been transferred to the ISCP.

FIG. 1A also illustrates two data terminal type interfaces for entering the subscriber's data. First, a dedicated data communication line 26 provides a direct connection from the data terminal 22 to the SMS 41. The data terminal preferably is a relatively smart, programmable device, such as a personal computer or a computerized work station. The data terminal 24 is located on the subscriber's premises. The terminal would store considerable information relating to the subscriber's products and services and preset tables or forms for entry of the necessary data to control that subscriber's restricted access communication services. When the subscriber wants to activate communication services in relation to one or a series of products, the representative accesses the necessary data relating to products or services and completes the data tables to activate the communication services, for example identifying the particular line(s) for which service will be active and the on and off times. When the representative has entered and confirmed the data for activating the service, the terminal would download that data to the SMS 41 within the ISCP, via the dedicated data link 26. The dedicated data line allows rapid transfer of large quantities of data, for example to facilitate activating communications relating to a large number of the subscriber's products or services, such as a group of flights which are delayed or cancelled because a hub airport terminal is closed due to inclement weather.

Alternatively, the subscriber could have a terminal 24 connected to a standard telephone line 27. The terminal 24 includes a modem (not shown) for transmitting and receiving data over a voice grade telephone line. The terminal 24 operates in a manner similar to the terminal 22, except that the terminal 24 downloads the relevant data via the lines and trunks of the public switched telephone network. The SMS 41 connects to a dial-up telephone line 28 and includes a modem (not shown) connected to that line. To download data, the operator initiates a call to the SMS by manually or automatically dialing the number of the telephone line 28 going to the SMS 41. The call is switched through the SSP's and trunks to establish the necessary connection, exactly as for a normal telephone call. When the modem connected to the SMS 41 answers on line 28, the modem in the terminal 24 executes a handshake procedure, and the terminal 24 downloads the data to the SMS 41.

The above discussion of the data terminals assumed that the terminals 22, 24 were preprogrammed to accept data inputs and subsequently download completed data entries. It is also possible to perform data input via either a dedicated link or a dial up link, using "dumb" terminal or a PC operating in a "dumb" terminal mode. With this approach, the SMS would send data to the terminal for display prompting the operator to input the necessary data. Any forms, tables or other customized data entry formats would be stored and sent from the SMS 41. The terminal would transmit the data inputs from the subscriber's representative to the SMS as the representative types them in on the terminal keyboard.

Security is controlled through the terminal and/or the line from which the terminal calls in to the ISCP.

The terminal may have a built in security code which the ISCP verifies before granting access to the database. If the subscriber uses the terminal 24 and standard telephone line 27, the ISCP may check the originating telephone number and the terminal identity number against a stored number from which that terminal is expected to call. Once access was granted, however, the terminal would only have access to an individual customer's files or the files of employees of a business customer. Other customer's files, and the programming which controls system operation, would not be available through such terminal access.

The ISCP includes a validation system, which is an expert system prevents incompatible entries. For example, the validation system prevents entry of service changes which would create infinite loops that would cause the switch to malfunction. For all of the different forms of data input discussed above, the validation system would examine all data inputs from subscribers and permit entry of new data into the SCP database 43 only if the received data is complete and is compatible with system operations.

Alternate Network Architectures

The Advanced Intelligent Network architectures shown in FIGS. 1 and 1A are preferred embodiments of telephone networks for practicing the present invention. However, a variety of other intelligent network architectures may be used. For example, none of the end office switches may have SSP functionality. Instead, each end office would connect to a trunk tandem which in turn feeds calls to a central SSP capable switch. The SSP then communicates with the ISCP, as in the implementation described above, but in this case via an SS#7 type CCIS link. In another intelligent network embodiment, some of the end offices are SSP capable, and some are not. Again, each of the end offices normally communicates through a trunk tandem. For the SSP capable switches, they communicate directly with an STP which relays communications to and from the ISCP, in the same manner as in the embodiment of FIGS. 1 and 1A. For those end offices which lack SSP capability, calls are forwarded to the SSP capable trunk tandem which in turn relays data to and from the ISCP. In these alternate embodiments, the SSP capable trunk tandem switches are digital switches, such as the 5ESS switch from AT&T; and the non-SSP type end offices might be 1A analog type switches.

As another alternative, the intelligent network architecture could use distributed intelligences rather than the single Integrated Services Control Point (ISCP) of FIG. 1. In such a network, the SSP's connect to an STP which routes data signalling type communications between the SSP's, between the SSP's and distant offices, and between the SSP's and an SCP. In this case, however, the SCP is essentially only a computerized database. Actual call processing is largely controlled by a Service Circuit Node (SCN). The SCP in turn connects to a Service Management System (SMS). The SCP and the SCN are both connected to a Service Management System (SMS). All new or modified service data is input through a Service Creation Environment (SCE), and a validation process within the SMS checks the input data for completeness and compatibility with the existing programs of the network. The service data is then loaded as necessary into the SCP database, and as needed into the Service Circuit Node (SCN). The SCN connects via a direct voice and data signalling link to the SSP type switch, and is typically an adjunct processor device directly associated with one of the switches. The SCN stores the actual control programs and many of the look up tables for controlling actual call processing. In this type of intelligent network, one of the SSP's will detect a triggering event and launch a TCAP query through the STP to the SCP, in a manner similar to that discussed above with regard to FIG. 1. The SCP checks its data to determine that the caller is a customer and determines what general type of service the caller has requested. The SCP transmits a "SEND to RESOURCES" message back to the originating SSP instructing that SSP to access a channel to the SCN. The SCP also sends a message through the SMS and an X.25 packet switched data network to the SCN telling the SCN what type of call processing routine to execute. As needed, the SCN looks up information in its data tables relating to the call, and the SCN decides how to complete the call without further reference to the SCP. For interactive processing, playing announcements to the caller and collecting digits, the SCN may include an announcement frame similar to that included in an SSP, or the SCN may connect to a peripheral announcement platform.

I claim:

1. A telephone communication system comprising:

a plurality of telephone switching offices for selectively providing switched communication services to a plurality of subscriber telephone lines connected thereto;

a central control separate from the plurality of telephone switching offices, said central control sending data to and receiving data from one or more of the telephone switching offices, to control at least some switching operations thereof;

a group of subscriber telephone lines connected to at least one of the telephone switching offices, all said subscriber telephone lines of said group being assigned to one subscriber;

means for remotely programing information sent from a subscriber telephone line via a common channel interoffice signaling lines to said central control by the subscriber specifying a period of time and an authorization code for comparison to data entered by said callers; and a database in the central control for storing the received information, said means for remotely programming comprising means for inputting said subscriber information to said data base and means for setting a trigger in each telephone switching office associated with each subscriber telephone line of said group in accordance with said information programmed by said subscriber, wherein when a caller attempts to obtain a communication service over one of the subscriber telephone lines in said group:

a telephone switching office connected to the one subscriber telephone line accepts input information from the caller and transmits the input information from the caller to the central control, the central control accesses the information stored in the database to determine if the attempt to obtain a communication service occurred during said period of time and if the input information from the caller includes the authorization code, the central control instructs the telephone switching office connected to the one subscriber telephone line to provide a switched telephone communication service over the one subscriber telephone line if the attempt to obtain service occurred during the period and if the input information from the caller includes the authorization code.

2. A telephone communication system as in claim 1, wherein said means for remotely programming further comprises:
   means for providing prompts over a telephone line to the subscriber;
   means for receiving Dual Tone Multi-Frequency (DTMF) signals representative of data inputs dialed in on a keypad by the subscriber; and
   means for transferring the data inputs to the database for storage therein.

3. A telephone communication system as in claim 1, wherein said means for remotely programming further comprises:
   one of the telephone switching offices being responsive to dialing of a predetermined telephone number to receive DTMF input signals over a telephone line, said DTMF signals representing data identifying the period of time and the authorization code, wherein said one of the telephone switching offices transfers the data to the central control.

4. A telephone communication system as in claim 1, wherein said means for remotely programming comprises:
   an interactive voice response unit for providing prompts and for transmitting and receiving Dual Tone Multi-Frequency (DTMF) signals; and
   a telephone line connecting the interactive voice response unit to one of the telephone switching offices, wherein:
   the one telephone switching office connects a call to the telephone line to the interactive voice response unit in response to dialing of a first predetermined telephone number by the calling party, when connected, the interactive voice response unit sends prompts to a calling party and receives DTMF signals representing information identifying the period of time and the authorization code from the calling party, and
   after the call is disconnected from the telephone line to the interactive voice response unit, the one telephone switching office is responsive to input of a second predetermined telephone number by the interactive voice response unit to receive DTMF input signals from the interactive voice response unit representing data identifying the period of time and the authorization code, wherein said one of the telephone switching offices transfers the received data to the central control.

5. A telephone communication system as in claim 1, wherein said means for remotely programming further comprise means for receiving data communications signals from a data terminal.

6. A telephone communication system as in claim 1, wherein said central control is an Integrated Service Control Point (ISCP) and the switching office connected to the one telephone line is a Service Switching Point (SSP), said system further comprising means for communicating data between the SSP and the ISCP.

7. A method of controlling provision of communication services over an identified group of subscriber telephone lines assigned to one subscriber, said subscriber telephones lines connecting to a public switched telephone network, said method comprising:

remotely programing into a centralized data base information sent from a subscriber telephone line via common channel interoffice signaling line to said central control by the subscriber identifying a period of time when the communication services provided over the group of subscriber telephone lines should be active and an authorization code;
storing the received information in the centralized database within the public telephone switched network and setting a trigger in each telephone switching office associated with each subscriber telephone line of said group in accordance with said information programmed by said subscriber;
detecting an attempt to initiate a call on one of the lines of the group:
receiving information from a caller on the one line of the group; and
providing a connection from the one line of the group to a destination telephone only if the attempt to initiate a call was detected within the period and the information from the caller includes information corresponding to the authorization code.

8. A method as in claim 7, wherein the authorization code comprises a code identifying a product or service offered by the subscriber and a password, said method further comprising the steps of:
   comparing a first predetermined portion of said information from the caller with the code identifying a product or service; and
   comparing a second predetermined portion of said information from the caller with the password,
   wherein the information from the caller corresponds to the authorization code only if the first predetermined portion matches the code identifying a product or service and the first predetermined portion matches said password.

9. A method as in claim 7, wherein the step of providing a connection comprises routing the connection over trunk facilities identified by information stored in the centralized database.

10. A method as in claim 9, further comprising the step of receiving from the subscriber information identifying trunk facilities, and storing the information identifying trunk facilities in the centralized database for subsequent use in routing the connection.

11. A method as in claim 10, wherein the information identifying a period of time and an authorization code and the information identifying trunk facilities are received from the subscriber via a telephone line.

12. A method as in claim 7, wherein the information identifying a period of time and an authorization code is received from the subscriber via a telephone line.

13. A telecommunication system comprising:
   a plurality of switching offices for selectively providing switched communication services to a plurality of communication lines connected thereto;
   a central control separate from the plurality of switching offices, said central control sending data to and receiving data from one or more of the switching offices to control at least some switching operations thereof;
   a group of communication lines connected to at least one of the switching offices, all of said group of communication lines being assigned to one subscriber;
   means for remotely programming information sent from a subscriber telephone line via a common channel interoffice signaling line to said central control by the subscriber, specifying criteria under which the subscriber wishes to offer communication services over the group of lines to one or more of the subscriber's customers; and means for storing the programmed information in a database in the central control, and means for setting a trigger in each telephone switching office associated with each subscriber telephone line of said group in accordance with said information programmed by said subscriber, wherein when a caller attempts to obtain a communication service over one of the communication lines in said group:

a switching office connected to the one communication line transmits information characterizing the attempt to obtain a communication service to the central control, the central control accesses the information defining criteria stored in the database and instructs the switching office connected to the one communication line to provide switched communication service over the one line if the information characterizing the attempt to obtain a communication service meets the criteria.

14. A method of controlling provision of communication services over an identified group of communication lines assigned to one subscriber, said communication lines connecting to a switched communication network having a plurality of switching offices, said method comprising:

remotely programming into a central data base sent from a subscriber telephone line via a common channel interoffice signaling line to said central control by the one subscriber, information defining criteria under which the one subscriber wishes to offer communication services over the group of lines to one or more persons;

storing the programmed information in a centralized database in the switched communication network separate from the plurality of switching offices and setting a trigger in each telephone switching office associated with each subscriber telephone line of said group in accordance with said information programmed by said subscriber;

detecting an attempt by one of the persons to obtain a communication service over one of the communication lines in said group;

transmitting information characterizing the attempt to obtain a communication service from a switching office connected to the one communication line to the centralized database;

accessing the information defining criteria stored in the centralized database; and providing a communication service on said one of the lines of the group if the information characterizing the attempt to obtain a communication service meets the criteria.

15. A method as in claim 14, wherein:
the criteria includes an authorization code;
the information characterizing the attempt to obtain a communication service includes information input by the one person; and
communication service is provided on said one of the lines of the group if the information input by the one person includes the authorization code.

16. A method as in claim 15, wherein the authorization code comprises a code identifying a product or service offered by the subscriber and a password, said method further comprising the steps of:

comparing a first predetermined portion of said information input by the one person with the code identifying a product or service; and comparing a second predetermined portion of said information input by the caller with the password, wherein the information input by the caller corresponds to the authorization code only if the first predetermined portion matches the code identifying a product or service and the second predetermined portion matches said password.

17. A method as in claim 15, wherein information defining the authorization code is received from the subscriber via a communication line connected to one of the switching offices.

18. A method as in claim 14, wherein the communication service is provided on said one of the lines of the group when the criteria indicates that service is active when the one person attempts to obtain a communication service.

19. A method as in claim 18, wherein criteria indicates that service is active by defining a period of time, and the communication service is provided on said one of the lines of the group when the attempt to obtain a communication service is detected during said period of time.

20. A method as in claim 14, wherein the switched communication network comprises a public switched telephone network, the lines of the group are telephone lines, and the step of providing a communication service comprises providing a switched telephone call connection from the one of the lines of the group to a destination telephone line.

21. A method as in claim 20, wherein the criteria identifies certain types of telephone calls which the subscriber wants to permit.

22. A method as in claim 20, wherein the step of providing a switched telephone call connection comprises routing the connection over trunk facilities identified by information stored in the centralized database.

23. A method as in claim 22, further comprising the step of receiving from the subscriber information identifying trunk facilities, and storing the information identifying trunk facilities in the centralized database for subsequent use in routing the connection.

24. A method as in claim 23, wherein the information identifying trunk facilities is received from the subscriber via a telephone line.

25. A method as in claim 14, wherein the information defining criteria is received from the subscriber via a communication line connected to one of the switching offices.

26. A method as in claim 14, wherein:
the criteria includes a code identifying a product or service offered by the subscriber, a password and information defining a period of time during which service should be active;
the information characterizing the attempt to obtain a communication service includes information input by the one person and a time at which the attempt was made, said method further comprising the steps of:

comparing a first predetermined portion of said information input by the one person with the code identifying a product or service;

comparing a second predetermined portion of said information input by the one person with the password; and comparing the time at which the attempt was made with the period of time during which service should be active, wherein communication service is provided on said one of the lines of the group if the first predetermined portion matches the code identifying a product or service, the second predetermined portion matches said password and the time at which the attempt was made is within the period of time during which service should be active.

27. A method as in claim 26, wherein the criteria also identifies certain types of communication service the subscriber wants to permit and the communication service is provided on said one of the lines of the group if the subscriber requests a type of communication service which the subscriber wants to permit.

28. A method as in claim 26, wherein the step of providing a communication service comprises providing a communication link over trunk facilities identified by information stored in the centralized database.

* * * * *